United States Patent
Moskaluk et al.

(10) Patent No.: US 7,411,608 B1
(45) Date of Patent: Aug. 12, 2008

(54) SYSTEM AND METHOD FOR PRODUCING PHOTOGRAPHIC PRINTS

(76) Inventors: Raymond Wayne Moskaluk, 1067 Almarida Dr., San Jose, CA (US) 95128; Jaime E. Dorman, 17575 Via Loma Dr., Poway, CA (US) 92064-2147; Jodi Bay, 2422A Badajcz Pl., Carlsbad, CA (US) 92009; Stephen Hall, 11078 Indian Lore Ct., San Diego, CA (US) 92127; Mark McCluskey, 3939 Plateau Pl., Escondido, CA (US) 92025; John Jamieson, 780 el Verano Dr., Walnut Creek, CA (US) 94598; Robert A. Horenstein, 992 Burtwood Dr., San Jose, CA (US) 95120; Jeffrey A. Tilley, 527 23rd Ave., #207, Oakland, CA (US) 94606; Joseph Wong, 11004 Matinal Cir., San Diego, CA (US) 92127

( * ) Notice: Subject to any disclaimer, the term of this patent is extended or adjusted under 35 U.S.C. 154(b) by 690 days.

(21) Appl. No.: 10/923,207

(22) Filed: Aug. 20, 2004

(51) Int. Cl.
| H04N 5/225 | (2006.01) |
| H04N 5/222 | (2006.01) |
| B41J 29/13 | (2006.01) |

(52) U.S. Cl. .................... 348/207.2; 348/373; 348/375; 348/333.02; 348/333.05; 347/108

(58) Field of Classification Search ............. 348/207.2, 348/373, 375, 376, 333.02, 333.04, 333.05; 358/302; 347/108
See application file for complete search history.

(56) References Cited

U.S. PATENT DOCUMENTS

| 4,937,676 | A | 6/1990 | Finelli et al. |
| 5,802,413 | A | 9/1998 | Stephenson |
| 5,822,637 | A | 10/1998 | Stephenson |
| 5,894,326 | A | 4/1999 | McIntyre et al. |
| 6,040,849 | A | 3/2000 | McIntyre et al. |
| 6,104,886 | A | 8/2000 | Suzuki et al. |
| 6,149,256 | A | 11/2000 | McIntyre et al. |
| 6,191,815 | B1 | 2/2001 | McIntyre |
| 6,539,180 | B1 | 3/2003 | King |
| 6,552,743 | B1 * | 4/2003 | Rissman .................. 348/207.2 |
| 6,559,963 | B1 | 5/2003 | Kamimura |
| 6,577,338 | B1 | 6/2003 | Tanaka et al. |
| 6,618,078 | B1 | 9/2003 | Budrys |
| 6,618,553 | B1 | 9/2003 | Shiohara |
| 6,950,142 | B2 * | 9/2005 | Soumi et al. ............. 348/207.2 |
| 7,038,714 | B1 * | 5/2006 | Parulski et al. ........... 348/207.2 |

(Continued)

OTHER PUBLICATIONS www.kodak.com/eknec/PageQuerier; Aug. 19, 2004—KodakEasyShare Printer Docks.

(Continued)

*Primary Examiner*—Nhan T Tran (57) ABSTRACT

A system for producing photographic prints includes a digital camera, having a memory configured for storing images, and a stand-alone printer. The printer includes a docking port and control devices. The docking port is configured to mechanically receive the digital camera. The control devices are configured to allow selection of an image from the memory of the digital camera, and to initiate printing thereof by the printer. The system and method allow a user to deliver an image captured by the digital camera, either as a hard-copy print or as an electronic file, using controls of the printer device.

22 Claims, 4 Drawing Sheets

U.S. PATENT DOCUMENTS

| | | | |
|---|---|---|---|
| 7,167,206 B2 * | 1/2007 | Kayanuma | 348/375 |
| 7,212,229 B2 * | 5/2007 | Parulski et al. | 348/207.2 |
| 7,274,478 B2 * | 9/2007 | Oshima et al. | 358/1.15 |
| 2002/0071035 A1 * | 6/2002 | Sobol | 348/373 |
| 2002/0113996 A1 * | 8/2002 | Minakuti | 358/1.15 |
| 2003/0156200 A1 * | 8/2003 | Romano et al. | 348/207.99 |
| 2004/0201774 A1 * | 10/2004 | Gennetten | 348/375 |
| 2005/0225666 A1 * | 10/2005 | Katakai | 348/373 |

OTHER PUBLICATIONS www.kodak.com/eknec/PageQuerier; Aug. 19, 2004—Kodak EasyShare Printer Dock Plus.
www.kodak.com/eknec/PageQuerier; Aug. 19, 2004—Kodak EasyShare Printer Dock 6000.

* cited by examiner

SYSTEM AND METHOD FOR PRODUCING PHOTOGRAPHIC PRINTS

BACKGROUND OF THE INVENTION

1. Field of the Invention

The present invention relates generally to the printing of digital images recorded by a digital camera.

2. Related Art

The advent of digital photography has sparked a revolution. With digital photography there is no need to buy or process film because images are stored digitally. Advantageously, the memory capacity of most digital cameras (or memory cards associated therewith) allows a larger number of images to be taken and stored at one time than with photographic film. Additionally, images can usually be viewed immediately on a small LCD viewscreen associated with the camera, rather than taking multiple images and waiting for film to be developed to determine which images are most desired. Unwanted images can simply be erased and never printed. Moreover, digital images can be electronically manipulated or augmented before printing, such as removing unwanted visual features or flaws, adding text or other images or graphics, combining images, or arranging multiple images for printing on a common substrate. Finally, producing hard copy photo prints is much simpler and easier. Whereas photographic film must be chemically processed at a photo lab, digital photos can be printed with common computer printers, such as ink jet printers.

These developments have produced a quantum leap in the flexibility, efficiency, ease, and simplicity of photography. It is estimated that fully 30% of U.S. households currently have and use digital photographic equipment, and that proportion is continually rising.

One challenge still presented by digital photography is the convenience of printing systems. Systems have been developed for printing images recorded by digital cameras. For example, personal computers (PC's) with attached printers are frequently used for printing digital photographic images. However, many of these systems are cumbersome and awkward to use, and present control limitations which can reduce the ease and convenience that digital photography promises. It would therefore be advantageous to develop an economical and portable system for producing photographic prints from images recorded by digital cameras. It would also be desirable to have such a system that is easy to operate and control, and which adds to the ease and convenience of using digital cameras.

SUMMARY OF THE INVENTION

In accordance with one aspect thereof, the invention provides a system and method for producing a photographic print. The method includes the steps of capturing at least one image with a digital camera having a memory, mechanically docking the digital camera with a stand-alone printer device, and manipulating controls of the printer device to create a photographic print of the at least one image on a substrate.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

Figure 2:
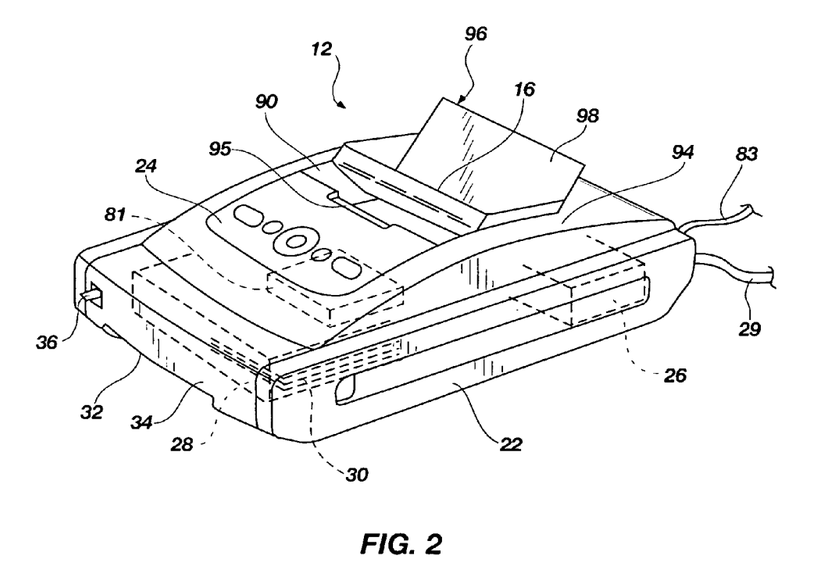
FIG. 2 is a perspective view of one embodiment of a printer configured for receiving the camera of FIG. 1.
Figure 3:
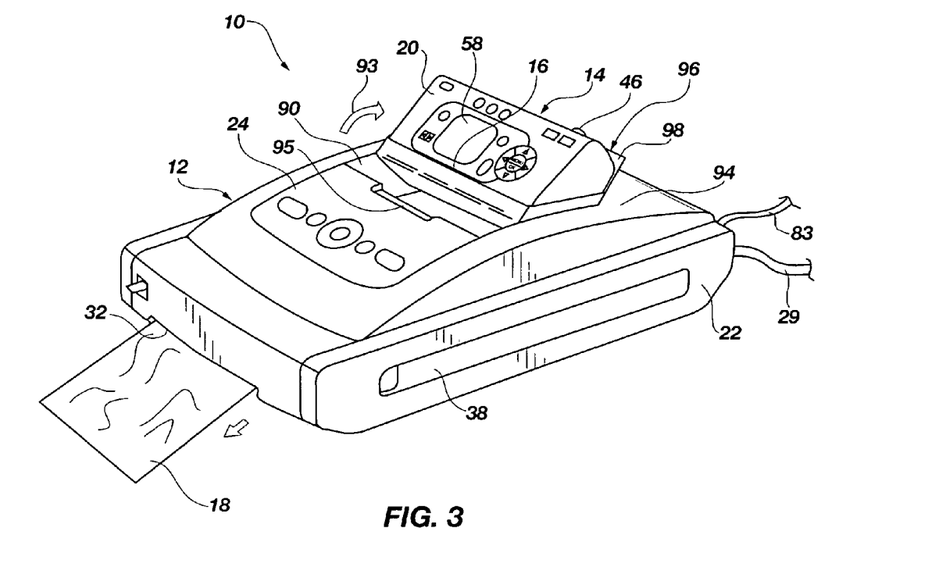
FIG. 3 is a perspective view of a combination of the camera of FIG. 1 and printer of FIG. 2, with the camera disposed generally upright in the docking port.

The present invention advantageously provides a system and method for producing photographic prints from a digital camera. In one embodiment, the system generally comprises a camera/printer combination 10, shown in FIGS. 3 and 4. The combination includes a digital camera 14, shown separately in FIG. 1, and a stand-alone printer 12, shown separately in FIG. 2. The printer includes a docking port 16 that is configured to releasably mechanically receive the digital camera and provide a data connection, to allow printing of hard copies 18 of digital images created by the digital camera. The operational docking configuration is shown in FIG. 3, with the camera in a generally upright orientation, the back face 20 of the camera and its related controls exposed for convenience of use.

Figure 4:
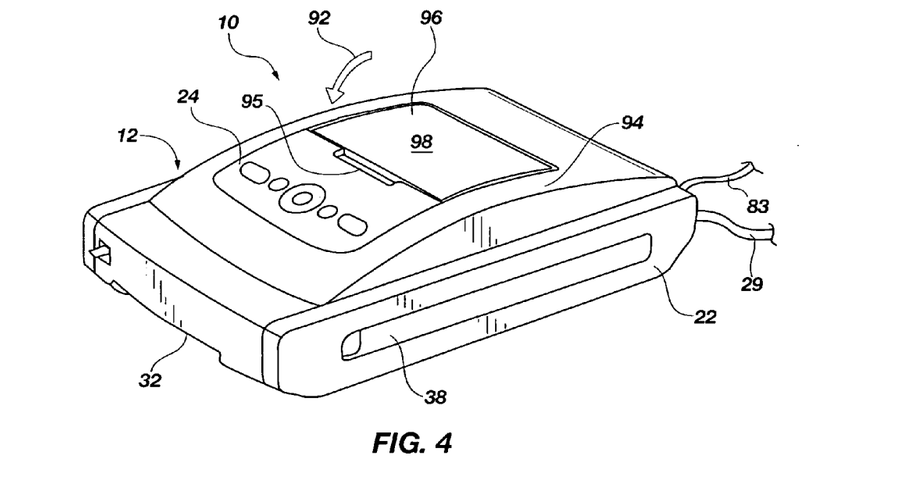
FIG. 4 is a perspective view of the camera/printer combination of FIG. 3, with the cradle and camera rotated down into the recess for transport.

The docking port 16 is disposed within a docking cradle 96 that is pivotally disposed in a recess 90 in the top region of the printer 12. The camera 14 is configured to fit into the docking port of the docking cradle, as shown in FIG. 3. The docking port and camera can include a releasable detent or other mechanism that allows the camera to be held securely in the docking port, while still allowing the camera to be removed when needed. Advantageously, the docking cradle can be rotated forward and down into the recess to a closed position as shown in FIG. 4. The cradle includes a back plate 98 that functions as a cover panel. In the closed position the camera becomes contained within the recess, with the back plate covering the recess and fitting substantially flush with the top surface 94 of the printer.

The printer 12 generally comprises a base unit 22, with a control panel 24 conveniently located atop the front of the device, and a printer engine 26, paper tray 28, and associated mechanical and electrical structure disposed within the base unit. The printer engine can be an ink jet printer, for example, though other types of printing devices can be used. The printer shown in the figures can be configured to operate on conventional AC power and includes a power cord 29 for connection to a conventional AC outlet. However, it will be apparent that the printer device could be powered in other ways, such as with batteries, etc.

The paper tray 28 is configured to hold a supply of sheets of substrate 30 (e.g. paper, etc.) on which images are to be printed, and the system is designed to eject completed prints 18 through a slot 32 disposed in a lower region of the front 34 of the printer base 22. In one embodiment, the substrate comprises photographic quality paper that is approximately 4 inches by 6 inches in size. This size allows the creation of relatively large prints, yet allows the printer device to remain relatively small. That is, the footprint of the printer base 22 is only moderately larger than the size of the paper tray, the size of which is related to the size of the substrate. This allows a very compact system.

The substrate 30 can be any type of material that is compatible with the internal mechanics of the printer device, and upon which images can be printed. Paper is perhaps the most common substrate, though the printer device is not limited to the use of paper. Suitable paper substrates can include photographic quality paper and special ink jet papers that are configured to provide high quality, long lasting prints. Likewise, substrates configured to provide a matte finish or glossy finish can be used as desired. Other substrates such as cardstock and even non-paper substrates can also be used. A paper tray release lever 36 is provided to allow a user to remove and refill the paper tray when needed. A window 38 is also provided in the side of the printer base to allow a user to view and monitor the quantity of paper or other substrate in the paper tray.

Figure 1:
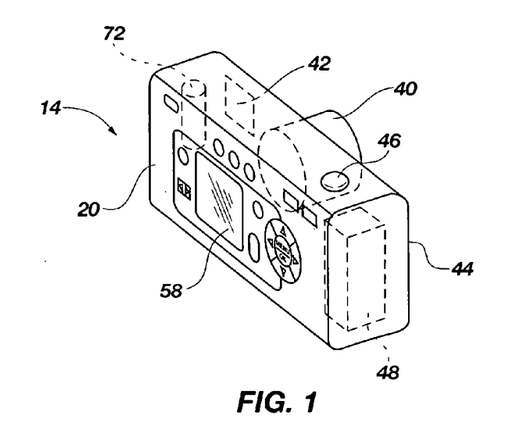
FIG. 1 is a perspective view of one embodiment of a digital camera configured for use in a camera/printer combination.

Viewing FIG. 1, the digital camera 14 includes a lens 40 (e.g. a retractable or telescoping lens) and flash bulb 42 on its front face 44, and an actuation button 46 on its top, by which a user activates the camera to record an image. Naturally, the camera includes a memory 48 configured for storing images when a user presses the actuation button. The camera 14 can also include one or more rechargeable batteries 72, with the printer 12 including circuitry for recharging the battery or batteries of the digital camera. The camera and printer have an electrical interconnection system that allows the printer to recharge the rechargeable batteries of the camera when the camera is disposed in the docking port 16. This electrical interconnection could be a wired connection (e.g. using electrical contacts that physically interconnect the camera and docking port) or a wireless connection (e.g. using a magnetic induction system). Thus, while the camera is docked, and even while the camera is exchanging data with the printer, its batteries can be recharging in preparation for the next use of the camera. Power for recharging the camera is supplied through or from the printer. The printer can include appropriate transformers (not shown) for converting AC to DC, if needed. It will be apparent that the camera could be configured without rechargeable batteries, having replaceable dry cell batteries or some other power supply system, with no need or provision for recharging the camera through the printer.

Figure 5:
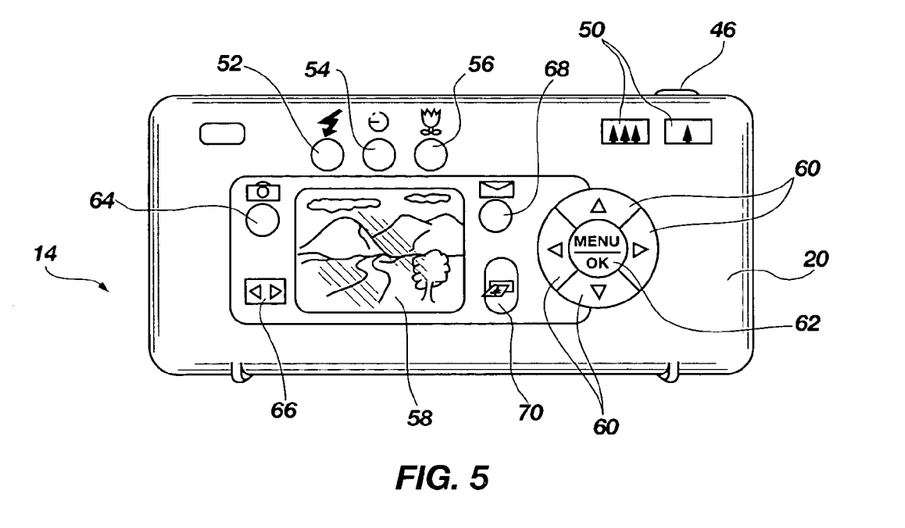
FIG. 5 shows a close-up view of the control panel of the camera of FIG. 1.

The rear or back face 20 of the camera 14 includes various features, shown more clearly in FIG. 5. The camera includes buttons 50 for selecting a wide angle or telephoto view, a button 52 to actuate the flash mode, a timer button 54, and a button 56 for indicating lighting conditions. In the center of the back face the camera includes a visual display 58 (e.g. a small LCD view-screen), that enables a user to view images that have been stored in the memory 48 of the camera. The visual display can also show control menus and other information related to the operation of the camera. Associated with the display are a plurality of directional navigation buttons 60 and a center select button 62 labeled "Menu/OK." These controls allow a user to view the control menu, navigate through various parts of the control menu, and select desired features or actions, and also to scroll through and select desired visual images.

Disposed near the display 58 are some other control buttons that aid in the use of the camera. One of these buttons 64 allows a user to switch from camera mode, wherein the image on the display is that currently seen through the lens 40, to view mode, wherein the image on the display is a previously stored image. A selector toggle 66 (e.g. a rocker switch) is also provided to allow a user to scroll through stored images. Also included are several controls for allowing a user to mark or designate specific images for various purposes or functions later. When viewing a given image on the camera display, the user can press the "send" button 68 to designate that the given image is to be sent via e-mail to a particular individual. Similarly, the user can press the "print" button 70 to designate that the image is to be printed. The user can thus use the camera controls to scroll through all images stored in memory in the camera and mark or designate one or more subsequent actions to be taken with each image.

When the camera 14 is docked with the printer 12 in the operational configuration shown in FIG. 3, the camera and printer are electronically interconnected, allowing the transfer of data between the camera and the printer. This interconnection can be configured in many ways. One option is to provide electrical contacts (not shown) on the printer and the camera, these contacts being configured to mechanically physically engage each other when the camera is inserted into the docking port 16 to allow data to flow between the devices. Such temporary physical interconnection of digital devices through docking stations, cradles, and the like is well known in the art. Alternatively, the printer and camera can be configured with a wireless data connection between the printer and the camera, such as a radio frequency or infrared data communication system. For example, radio frequency communication between the printer and camera could use a Bluetooth® or other short range communication protocol. Such systems are well known and are widely used for wireless communication for PDA's and other portable electronic devices. It is anticipated that both the data connection and electrical power connection (for recharging the camera batteries) will both be wireless, or both mechanical. However, it will be apparent that a hybrid system could be provided wherein one of the data connection and power connection is wireless, and the other is not.

Advantageously, the selecting and printing of images can be controlled using the control devices of the printer 12, to allow selection of an image from the memory 48 of the camera 14. The control panel 24 of the printer provides control devices that are configured to allow selection of an image from the memory of the digital camera, and to initiate printing thereof, so as to deliver the image data in the form of a hard-copy print. The control panel is shown in a close-up view in FIG. 6. The printer control devices include a print actuator. In the embodiment shown in FIG. 6, the print actuator comprises a "print" button 82 configured to activate the printer engine (26 in FIG. 3) to print images. After docking the camera with the printer, the user can cause the printer to automatically print all images that have been previously marked or designated "print" (using the "print" button 70 of the camera) by pressing the "print" button of the printer.

The camera/printer combination 10 also allows delivery of image data in forms other than hard-copy prints. In the embodiment shown in FIG. 2, the printer 12 includes a controller 81 that can include a microprocessor, memory, and a communications interface for allowing transmission of data to and from other compatible devices. The communications interface can be configured in a variety of ways. For example, the communications interface can be configured to provide an Internet connection, allowing a user to send image data to any desired Internet destination. Alternatively, the communications interface can be configured as a network interface, interconnecting the printer to a computer network or network server, a print server, etc., making the printer/camera combination a network device.

In any of these configurations, the communications interface can be either a wireless or hard-wired device. For example, the controller 81 can include wireless telephone circuitry, essentially causing the printer to have a built-in wireless telephone. Alternatively, the camera/printer combination can include a data connection line 83, for a hard-wired data connection to a network, an Internet server, etc. It will be apparent that any or all of the above communications interface configurations and combinations can be associated with the printer/camera combination.

Through the communications interface of the controller 81, images that have been previously marked or designated "send" (using the "send" button 68 of the camera) can be automatically delivered or transmitted (e.g. as e-mail) as digital data over a computer network, the Internet, etc., to a selected destination whenever a particular control device of the printer (e.g. the "print" button 82 or other control device) is actuated. The image data to be sent can be taken from the memory of the camera or the memory of the printer. Thus, the image data can be delivered either as a photographic print or as an electronic file.

Referring again to FIG. 6, the control devices of the printer 12 also include an image selection actuator 76 that is configured for allowing selection of specific desired images from the memory of the camera. In the embodiment shown, the image selection actuator comprises a group of navigational arrow buttons 78 and a center select button 80 marked "OK." These controls allow a user to perform substantially the same functions as the navigational and select buttons (60, 62 in FIG. 5) on the camera 14. That is, using these controls a user can scroll through and mark or select desired images for printing or sending via e-mail (viewing the display 58 on the camera), view the control menu on the camera, navigate through various parts of the control menu, and select other desired features, functions, or actions.

Figure 6:
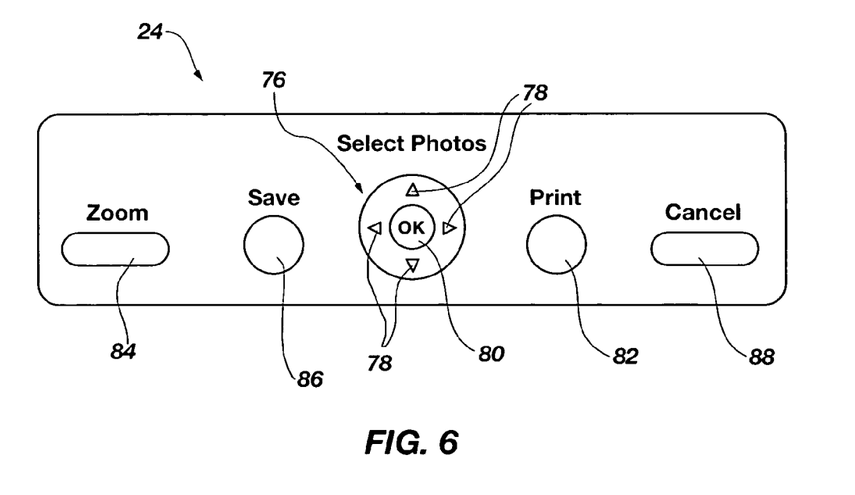
FIG. 6 shows a close-up view of the control panel of the printer of FIG. 2.

The printer control devices also include a "zoom" button 84, a "save" button 86, and a "cancel" button 88. The "zoom" button allows a user to manipulate the size of an image. This function can be used to zoom in on specific features of an image for manipulation, such as to use "red eye" software to eliminate red eyes in flash photographs. Alternatively, the zoom feature can be used in conjunction with the navigational buttons 78 to allow a user to zoom and pan around an image to crop and print just a portion of the image at a desired size. The "save" button allows a user to save data representing a selected image in memory in the microprocessor 81 of the printer. Saving the image in memory is an additional alternative form of delivery of image data, and data can also be delivered from the printer memory, as discussed above. The "cancel" button allows the user to interrupt the print process or cancel some other selected feature or function.

As noted above, the system is advantageously configured to allow the cradle 96 and camera 14 to be rotated down into the recess 90, to the transport configuration shown in FIG. 4. In this configuration, the body of the camera becomes substantially contained within the recess, such that the back plate 98 of the cradle is substantially flush with the top surface 94 of the printer. In the transport configuration, the cradle is releasably secured into position with a retaining mechanism 95, such as a latch or detent, so as to be secure, thus creating a compact, easily portable camera/printer combination. The printer can thus easily be transported with the camera contained therein, the camera being protected within the cradle and recess. The printer can also be provided with a handle (not shown) if desired to facilitate grasping and transport.

When it is desired to open the cradle 96 and remove the camera 14 for use, the user releases the retaining mechanism 95, allowing the cradle to be rotated up in the direction of arrow 93 to the operational docking configuration of FIG. 3. From this position the camera can be lifted out of the docking port 16 for use in taking pictures. When it is desired to again print images and/or recharge the batteries of the camera, the user simply returns the camera to the docking port. The camera and docking port can be configured to allow recharging of the camera batteries when the camera is in the operational docking configuration shown in FIG. 3, and/or in the transport configuration shown in FIG. 4.

Use of the camera/printer system provides a simple and convenient method for producing photographic prints. The general steps in one embodiment of the method are outlined in a flow chart in FIG. 7. Because the method allows a cycle of use of the camera and printer, the steps of the method flow in a circle (represented by arrow 116), such that the cycle can begin at almost any point. Consequently, it is not necessary that any one step be designated as the "first" step. An initial step in the method can be the step of a user capturing an image (step 100) using a digital camera having a memory. The user can then "mark" selected images (step 101) for printing (or sending via email) using the camera controls, as discussed above. This step is optional, however. The user then mechanically docks the digital camera (step 102) with the stand-alone printer device. Following insertion of the camera into the docking port, the user can then select or mark one or more images from the memory of the digital camera (step 104) using the controls on the printer device, or can bypass this step if images have previously been marked, as indicated by arrow 103. Advantageously, in the step of selecting photos using the printer controls the user can manipulate the controls on the printer device to selectively view images stored in the camera memory via the visual display associated with the camera.

Figure 7:
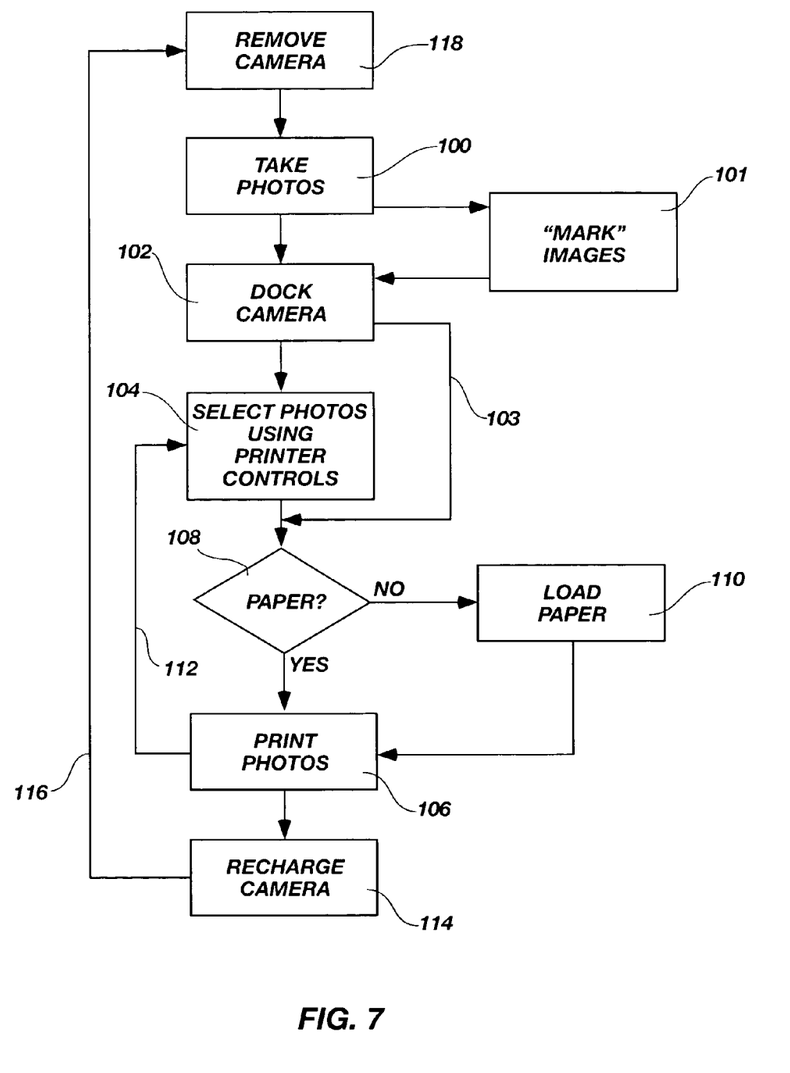
FIG. 7 is a flow chart showing the steps in one embodiment of a method for producing photographic prints.

At this point, the user can manipulate the controls of the printer device to create photographic prints (step 106) of the selected image(s). Prior to printing, it can be desirable to check the supply of paper (step 108) or other substrate. In the embodiment shown, checking the supply of paper or other substrate can be done by simply looking through the paper tray window 38 on the side of the printer device 12. If there is not sufficient paper, the user loads paper (step 110) and then proceeds to print the desired photos (step 106). After printing a selected photo, the user can return to the image selection step, as indicated by arrow 112, and use the printer controls to again select one or more additional photos to print, repeating the selecting (step 104) and printing (step 106) steps as often as desired.

As noted above, the camera 14 includes rechargeable batteries 72, which are automatically recharged by the printer device (step 114) while the camera is docked. After sufficient recharging, the camera is ready to be removed from the docking port (step 118) to be used to take more photos (step 100), and the cycle starts over again. As noted above, while the camera could be configured with non-rechargeable batteries, or some other power supply system, with no need or provision for recharging through the printer. In such a situation, the step of recharging the batteries of the camera would not apply.

The method outlined above with reference to FIG. 7 results in delivery of image data in the form of a hard-copy print of the image. However, as noted above, the camera/printer combination can also be used to deliver image data in digital form (e.g. data files) via the communications interface. That is, after the camera is docked with the printer, image data in digital or electronic form can also be transmitted (e.g. as electronic mail) via the Internet, through a computer network, or even to a printer server for printing through another printer device. This image data can be taken from the memory of the camera or the memory of the printer. Consequently, the camera/printer combination is configured to deliver image data in a variety of ways.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A system for producing photographic prints, comprising:
   a) a digital camera, having a memory configured for storing images; and
   b) a stand-alone printer, having
      (i) a docking cradle, configured to releasably receive the digital camera and to allow data transfer between the camera and the printer in an open position, and to rotate into a recess in the printer to substantially contain the camera within the recess in a closed position;
      (ii) control devices, configured to allow selection of an image from the memory of the digital camera and to initiate printing thereof; and
      (iii) a printer engine, configured to print the selected image on a substrate.

2. A system in accordance with claim 1, wherein the digital camera includes a visual display that is controllable by the control devices of the printer, and allows selection of an image from the memory of the camera using the control devices of the printer.

3. A system in accordance with claim 1, wherein the digital camera further comprises rechargeable batteries, and the printer is configured to recharge the rechargeable batteries when the camera is disposed in the docking cradle.

4. A system in accordance with claim 1, wherein the docking cradle is configured to selectively retain the camera in a transport configuration, such that the printer is portable with the camera attached thereto.

5. A system in accordance with claim 1, wherein the cradle comprises a back plate, configured to substantially cover the camera when in the closed position.

6. A system in accordance with claim 1, wherein the docking cradle comprises a wireless data connection between the printer and the camera.

7. A system in accordance with claim 1, wherein the control devices of the printer include at least one of an image selection actuator configured for selecting a desired image from the memory of the camera, a print actuator configured for activating the printer engine to print selected images, a zoom actuator configured for manipulating the size and orientation of the printed image, a save actuator for saving data representing the selected image in memory in the printer, and a cancel actuator for interrupting the print process.

8. A system in accordance with claim 1, further comprising a communications interface, configured to allow data representing a selected image to be transmitted from the printer to another electronic device.

9. A system in accordance with claim 8, wherein the communications interface is configured to wirelessly transmit the data representing the selected image.

10. A system in accordance with claim 1, further comprising means for electronically transmitting data representing a selected image to another electronic device.

11. A camera/printer combination, comprising:
   a) a digital camera, having a memory configured for storing images, and means for selectively displaying the images; and
   b) a printer device, having
      (i) means for receiving the digital camera, for allowing data transfer between the camera and the printer
      (ii) means for rotating the camera into a recess in the printer so as to retain and protect the camera during transport of the camera/printer combination;
      (iii) means for allowing selection of an image from the memory of the digital camera and to initiate printing of the selected image by the printer device; and
      (iv) means for printing the selected image on a sheet of substrate.

12. A camera/printer combination in accordance with claim 11, further comprising means, associated with the printer, for holding a supply of sheets of substrate.

13. A camera/printer combination in accordance with claim 12, wherein the substrate comprises paper that is approximately 4 inches by 6 inches in size.

14. A camera/printer combination in accordance with claim 11, further comprising means for electronically transmitting data representing a selected image to another electronic device.

15. A method for producing a photographic print, comprising the steps of:
   a) capturing at least one image with a digital camera having a memory;
   b) mechanically docking the digital camera into a cradle operable with a stand-alone printer device so as to allow data transfer between the camera and the printer device, wherein the cradle rotates into a recess formed in the printer device such that the camera is substantially completely disposed in the recess and covered by a cover plate of the cradle; and
   c) delivering data associated with the at least one image in an output form by manipulating controls of the stand-alone printer device.

16. A method in accordance with claim 15, wherein the step of delivering data associated with the at least one image comprises a step selected from the group consisting of creating a photographic print of the at least one image on a substrate, and transmitting image data to another electronic device via a communications interface.

17. A method in accordance with claim 16, wherein the step of delivering data associated with the at least one image comprises creating a photographic print of the at least one image on substrate comprising paper that is approximately 4 inches by 6 inches in size.

18. A method in accordance with claim 16, wherein the step of transmitting image data via a communications interface comprises transmitting image data via a wireless communication link.

19. A method in accordance with claim 15, further comprising the step of recharging batteries associated with the digital camera through the printer device when the camera is docked therewith.

20. A method in accordance with claim 15 further comprising the step of selecting the at least one image from the memory of the digital camera using the controls of the printer device.

21. A method in accordance with claim 20, wherein the step of selecting the at least one image from the memory of the digital camera comprises manipulating the controls on the printer device to selectively view images stored in the camera memory via a visual display associated with the camera.

22. A method in accordance with claim 15, wherein the controls of the printer include at least one of an image selection actuator configured for selecting a desired image from the memory of the camera, a print actuator configured for activating the printer to print the selected image, a zoom actuator configured for manipulating a size of the printed image, a save actuator for saving data representing the selected image in memory in the printer, and a cancel actuator for interrupting the print process.

* * * * *

UNITED STATES PATENT AND TRADEMARK OFFICE
CERTIFICATE OF CORRECTION

PATENT NO. : 7,411,608 B1
APPLICATION NO. : 10/923207
DATED : August 12, 2008
INVENTOR(S) : Raymond Wayne Moskaluk et al.

It is certified that error appears in the above-identified patent and that said Letters Patent is hereby corrected as shown below:

In column 8, line 15, in Claim 11, after "printer" insert -- , --.

Signed and Sealed this

Third Day of February, 2009

JOHN DOLL
*Acting Director of the United States Patent and Trademark Office*